US012366791B2

(12) United States Patent
Wu

(10) Patent No.: US 12,366,791 B2
(45) Date of Patent: Jul. 22, 2025

(54) LENS BARREL AND OPTICAL RECOGNITION DEVICE

(71) Applicant: NEWMAX TECHNOLOGY CO., LTD., Taichung (TW)

(72) Inventor: Chen-Chung Wu, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 811 days.

(21) Appl. No.: 17/563,974

(22) Filed: Dec. 28, 2021

(65) Prior Publication Data

US 2023/0140383 A1    May 4, 2023

(30) Foreign Application Priority Data

Oct. 28, 2021    (TW) ................ 110140066

(51) Int. Cl.
  *G03B 17/12*    (2021.01)
  *G02B 7/10*    (2021.01)
  *G06V 40/13*    (2022.01)
  *H04N 23/55*    (2023.01)

(52) U.S. Cl.
  CPC .............. *G03B 17/12* (2013.01); *G02B 7/10* (2013.01); *G06V 40/13* (2022.01); *H04N 23/55* (2023.01)

(58) Field of Classification Search
  CPC ........ G03B 17/12; G06V 40/13; H04N 23/55; G02B 7/10
  USPC ...................................... 359/819
  See application file for complete search history.

(56) References Cited

U.S. PATENT DOCUMENTS

| | | | | |
|---|---|---|---|---|
| 7,079,332 B2* | 7/2006 | Tanaka | ............. | G02B 7/023 359/822 |
| 7,859,775 B2* | 12/2010 | Chang | ............. | G02B 13/001 359/811 |
| 8,254,043 B2* | 8/2012 | Huang | ............. | G02B 13/003 359/822 |
| 2004/0070849 A1* | 4/2004 | Tanaka | ............. | G02B 7/10 359/808 |
| 2011/0075013 A1* | 3/2011 | Chang | ............. | G02B 7/021 348/335 |
| 2017/0322394 A1* | 11/2017 | Chou | ............. | G02B 13/0055 |
| 2018/0081144 A1* | 3/2018 | Lin | ............. | G02B 7/021 |
| 2022/0413251 A1* | 12/2022 | Wang | ............. | G02B 7/08 |
| 2024/0295714 A1* | 9/2024 | Fang | ............. | G02B 7/02 |

* cited by examiner

*Primary Examiner* — Sharrief I Broome
(74) *Attorney, Agent, or Firm* — Juan Carlos A. Marquez; Marquez IP Law Office, PLLC

(57) ABSTRACT

A lens barrel defines a central axis and includes: an object-side opening, an object-side end portion, and an image-side opening. The object-side opening and the object-side end portion are both located at one end of the central axis. The object-side end portion surrounds the object-side opening and has an object-side surface, the object-side surface includes an annular groove, a radial cross-section of the annular groove has first and second line segments, the first line segment is farther away from the central axis than the second line segment, the first and second line segments intersect at a first point, and a included angle is formed between the first and second line segments. The included angle is larger than or equal to 15 degrees and smaller than or equal to 90 degrees. An opening direction of the radial cross-section of the annular groove is away from the central axis.

20 Claims, 15 Drawing Sheets

LENS BARREL AND OPTICAL RECOGNITION DEVICE

CROSS-REFERENCE TO RELATED APPLICATION

This application claims the benefit of Taiwan Patent Application No. 110140066, filed on Oct. 28, 2021, which is hereby incorporated by reference for all purposes as if fully set forth herein.

BACKGROUND

Technical Field

The present disclosure relates to a lens barrel and an optical recognition device, and in particular, to a lens barrel and an optical recognition device, wherein an annular groove of the lens barrel can reduce the reflection of non-imaging light projected onto an object-side surface of the lens barrel, so as to reduce the stray light.

Related Art

With the popularization of electronic products equipped with imaging devices (such as mobile phones, tablet computers, and the like), the rise of miniaturized optical lens module has also been driven, and the demand for the miniaturized optical lens module having a high resolution and excellent imaging quality has also risen sharply.

The lens barrel is usually used to carry optical lenses in the optical lens module and provide a distance between any two optical lenses. The surface properties of the lens barrel are critical to the effect of suppressing the stray light. Therefore, the surface properties of the lens barrel jointly affect the imaging quality of the optical lens module. A conventional lens barrel is usually manufactured by means of plastic injection moulding, and has a smooth and bright surface and high reflectivity. Therefore, the stray light cannot be effectively suppressed.

Moreover, in the current mobile phone, an image sensor of the optical lens module is no longer disposed on the back side of the mobile phone. Instead, the image sensor of the optical lens module is disposed under the screen of the mobile phone (i.e., the screen of the display), and is sensed by means of the optical recognition technology. However, when the light L passes through a non-optical portion (for example, the light path is a lens barrel 91→a transparent plate 92 (i.e., a display panel)→an image sensor 93, as shown in FIG. 1), it is easy for a flat object-side surface 911 of the lens barrel 91 to form the stray light, to affect the recognition accuracy of the image sensor 93, and to cause the misjudgement or failure of fingerprint recognition.

Therefore, it is necessary to provide a lens barrel and an optical recognition device, so as to resolve the foregoing problems.

SUMMARY

An objective of the present disclosure is to provide a lens barrel and an optical recognition device. In this way, an annular groove of the lens barrel can reduce the reflection of non-imaging light projected onto an object-side surface of the lens barrel, so as to reduce the stray light.

To achieve the above objective, the present disclosure provides a lens barrel, defining a central axis, having an accommodating space, and comprising: an object-side opening and an object-side end portion, both located at one end of the central axis, wherein the object-side end portion surrounds the object-side opening and has an object-side surface, the object-side surface comprises an annular groove, a radial cross-section of the annular groove has a first line segment and a second line segment, the first line segment is farther away from the central axis than the second line segment, the first line segment and the second line segment intersect at a first point, and a straight line parallel to the central axis is defined to pass through the first point, a first included angle is formed between the first line segment and the straight line, a second included angle is formed between the second line segment and the straight line, and a third included angle is formed between the first line segment and the second line segment; and an image-side opening, located at the other end of the central axis; wherein 15 degrees≤the third included angle≤90 degrees, and an opening direction of the radial cross-section of the annular groove is away from the central axis.

The present disclosure further provides an optical recognition device, in order from an object side to an image side, comprising: a flat plate; a lens module; and an image sensor; wherein the lens module comprises the above-mentioned lens barrel and an optical lens assembly disposed in the lens barrel.

According to the optical recognition device of the present disclosure, the annular groove of the lens barrel has zigzag structure, in particular, the included angle (that is, the third included angle) of the radial cross-section of the annular groove is between 15 degrees and 90 degrees, and the opening direction of the radial cross-section of the annular groove is far away from the central axis, whereby the reflection of non-imaging light during projection onto the object-side surface of the lens barrel can be effectively reduced to reduce stray light, reducing non-imaging light entering the lens module, and improving the optical imaging quality.

BRIEF DESCRIPTION OF THE DRAWINGS

FIG. 6b is a schematic cross-sectional view of an enlarged part B of the lens barrel in FIG. 6a.

DETAILED DESCRIPTION

In order to make the foregoing objectives, features and characteristics of the present disclosure clearer and more comprehensive, the related embodiments of the present disclosure are described in detail below with reference to the accompanying drawings.

Figure 1:
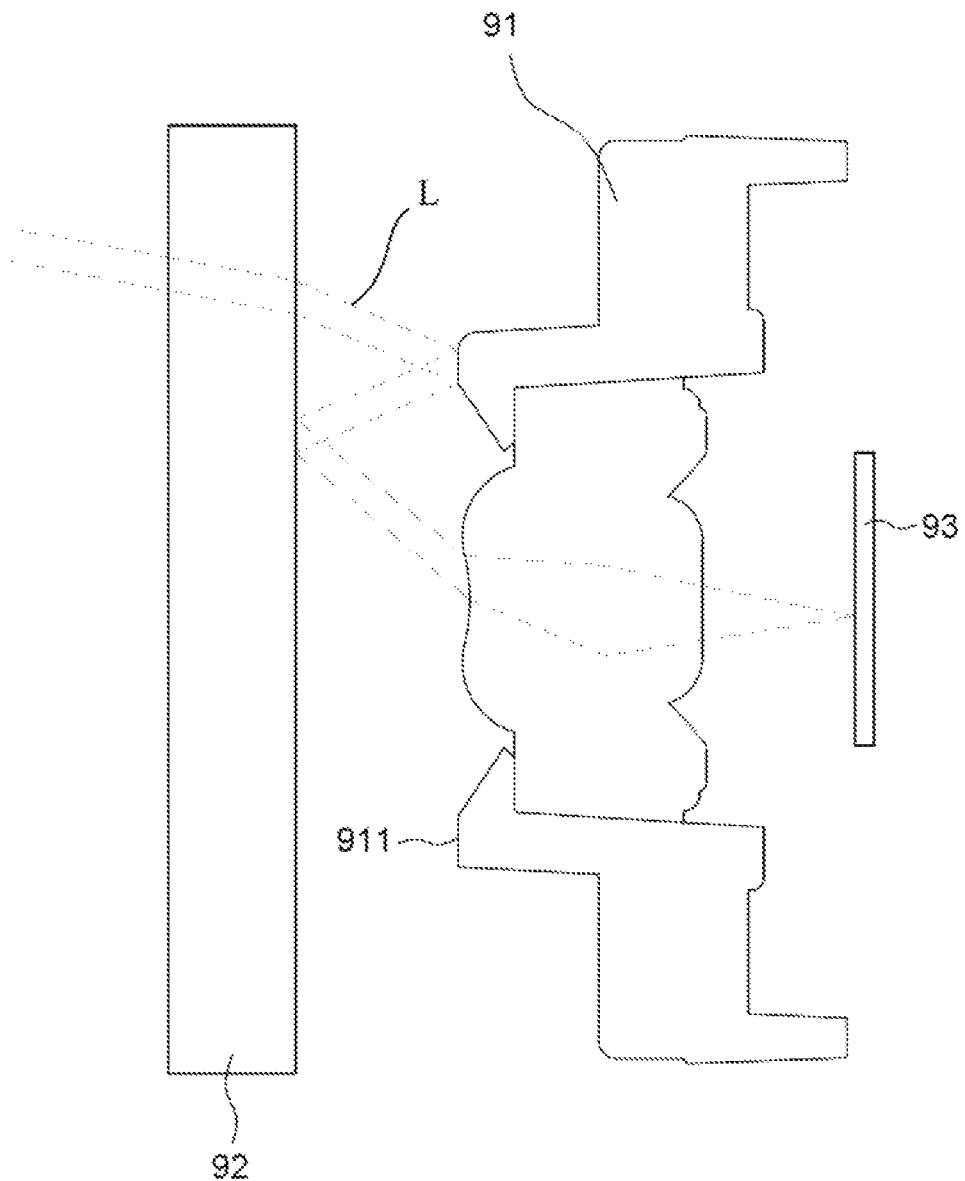
FIG. 1 is a schematic cross-sectional view of an optical recognition device in the prior art, showing a path of a non-imaging light.
Figure 2:
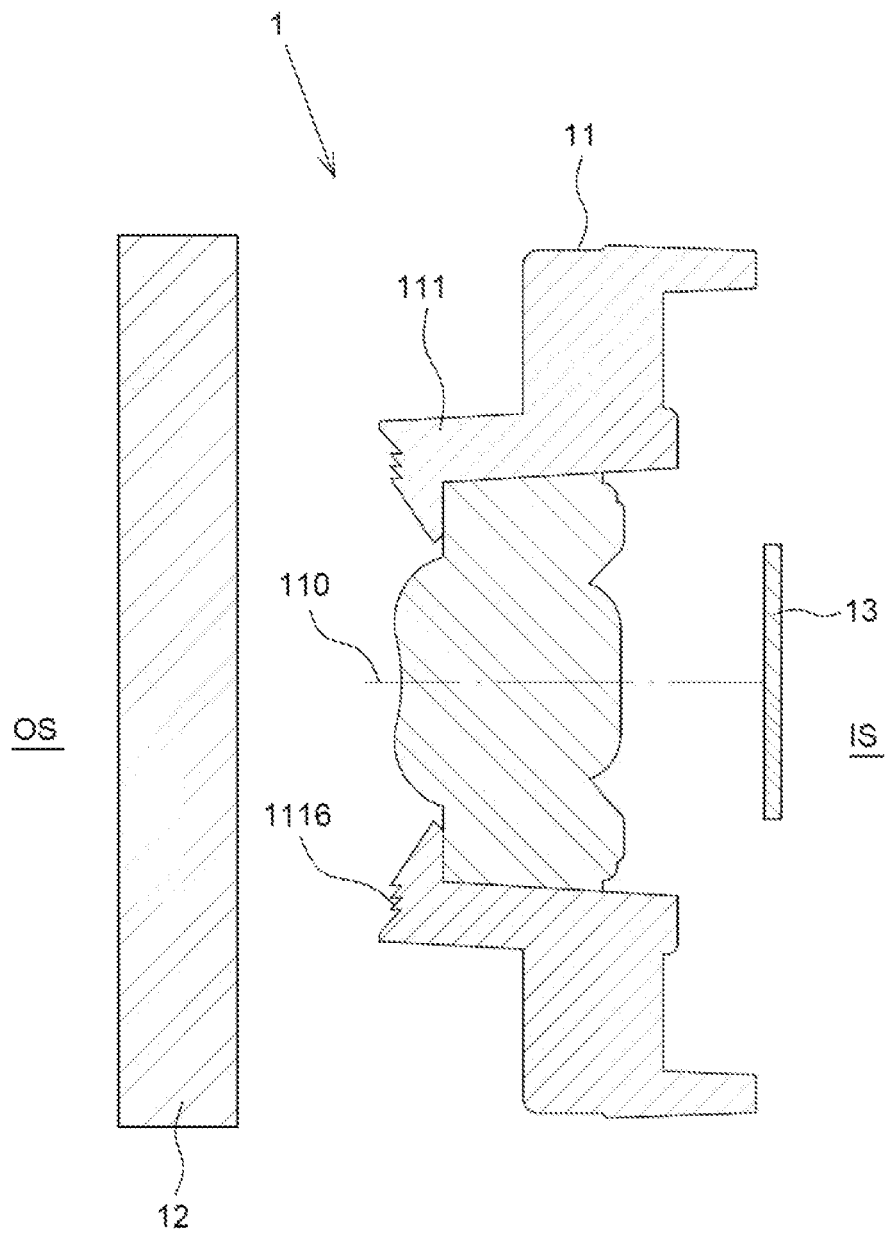
FIG. 2 is a schematic cross-sectional assembly view of an optical recognition device according to an embodiment of the present disclosure.
Figure 3:
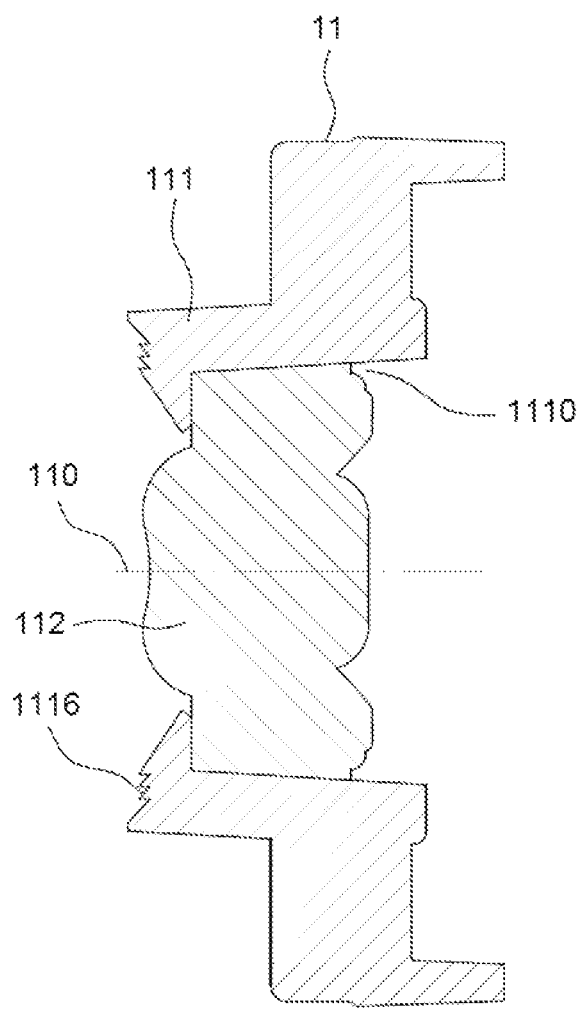
FIG. 3 is a schematic cross-sectional assembly view of a lens module according to an embodiment of the present disclosure.
Figure 4:
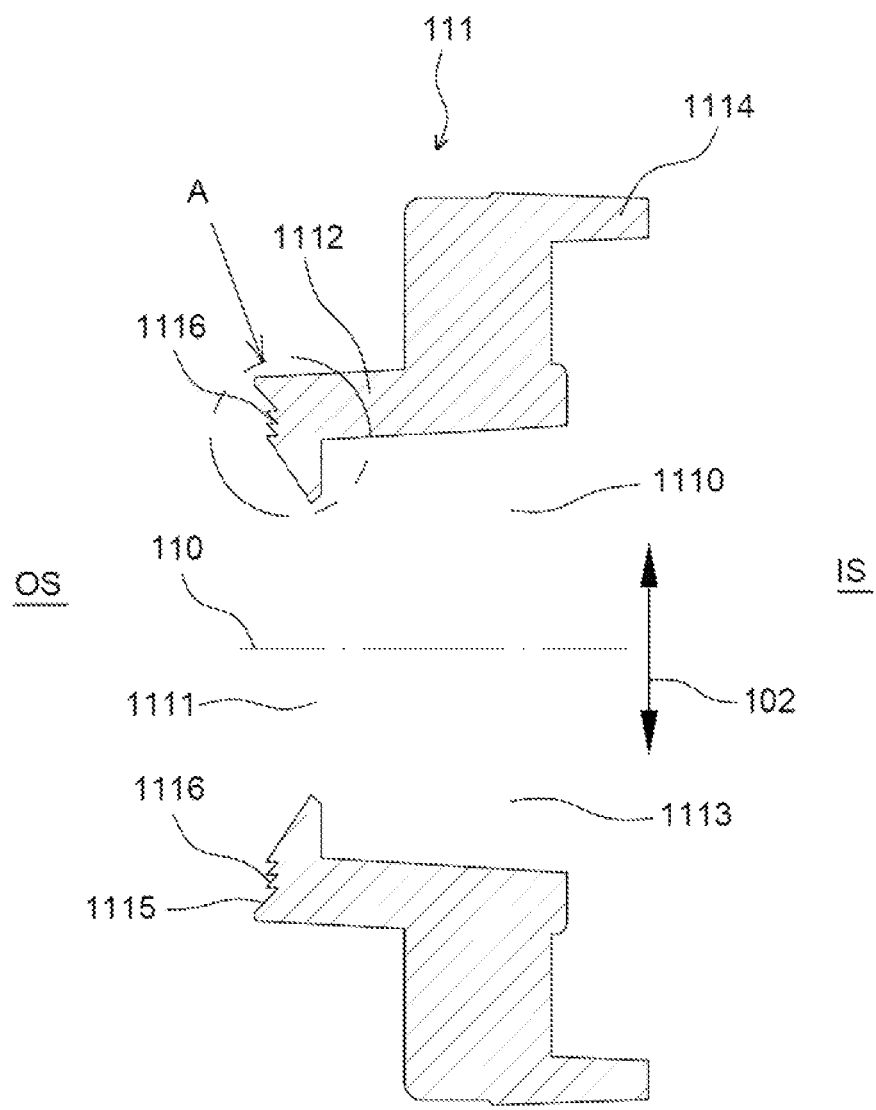
FIG. 4 is a schematic cross-sectional view of a lens barrel according to an embodiment of the present disclosure.

FIG. 2 is a schematic cross-sectional assembly view of an optical recognition device according to an embodiment of the present disclosure. An optical recognition device 1 may be an optical fingerprint-on-display (FOD) recognition device. FIG. 3 is a schematic cross-sectional assembly view of a lens module according to an embodiment of the present disclosure. FIG. 4 is a schematic cross-sectional view of a lens barrel according to an embodiment of the present disclosure. Referring to FIG. 2, FIG. 3, and FIG. 4, the optical recognition device 1 includes, in order from an object side OS to an image side IS: a flat plate 12, a lens module 11, and an image sensor 13. The flat plate 12 may be a display panel and has a display screen. The lens module 11 includes a lens barrel 111 and an optical lens assembly 112. The optical lens assembly 112 is disposed in an accommodating space 1110 of the lens barrel 111. The optical lens assembly 112 may include a plurality of optical lenses and may be made of plastic material or glass material. The lens barrel 111 may be an integrated lens barrel and may be made of the plastic material. The accommodating space 1110 of the lens barrel 111 accommodates the optical lenses or other optical elements. The optical element may include a spacer ring, an optical filter (for example, an infrared optical filter, an infrared bandpass optical filter, or other optical band filters), a light-shielding element (for example, an aperture stop or a stop configured to correct edge light), or the like.

Referring to FIG. 4 again, in this embodiment, the lens barrel 111 defines a central axis 110 (that is, an optical axis). The lens barrel 111 has an accommodating space 1110, and includes an object-side opening 1111, an object-side end portion 1112, an image-side opening 1113, and an image-side end portion 1114. The object-side opening 1111 and the object-side end portion 1112 are both located at one end of the central axis 110 (close to the object side OS), and the object-side end portion 1112 surrounds the object-side opening 1111. The image-side opening 1113 and the image-side end portion 1114 are both located at the other end of the central axis 110 (close to the image side IS), and the image-side end portion 1114 surrounds the image-side opening 1113.

Figure 5:
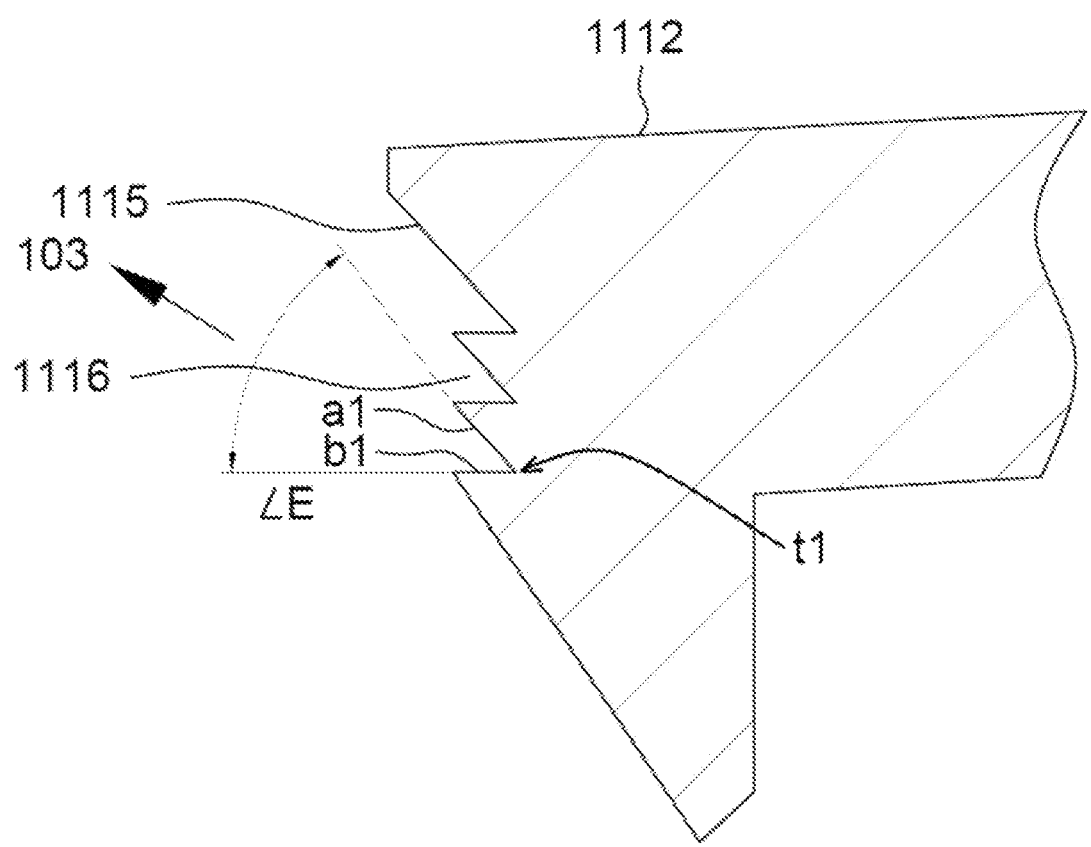
FIG. 5 is a schematic cross-sectional view I of an enlarged part A of the lens barrel in FIG. 4.
Figure 6A:
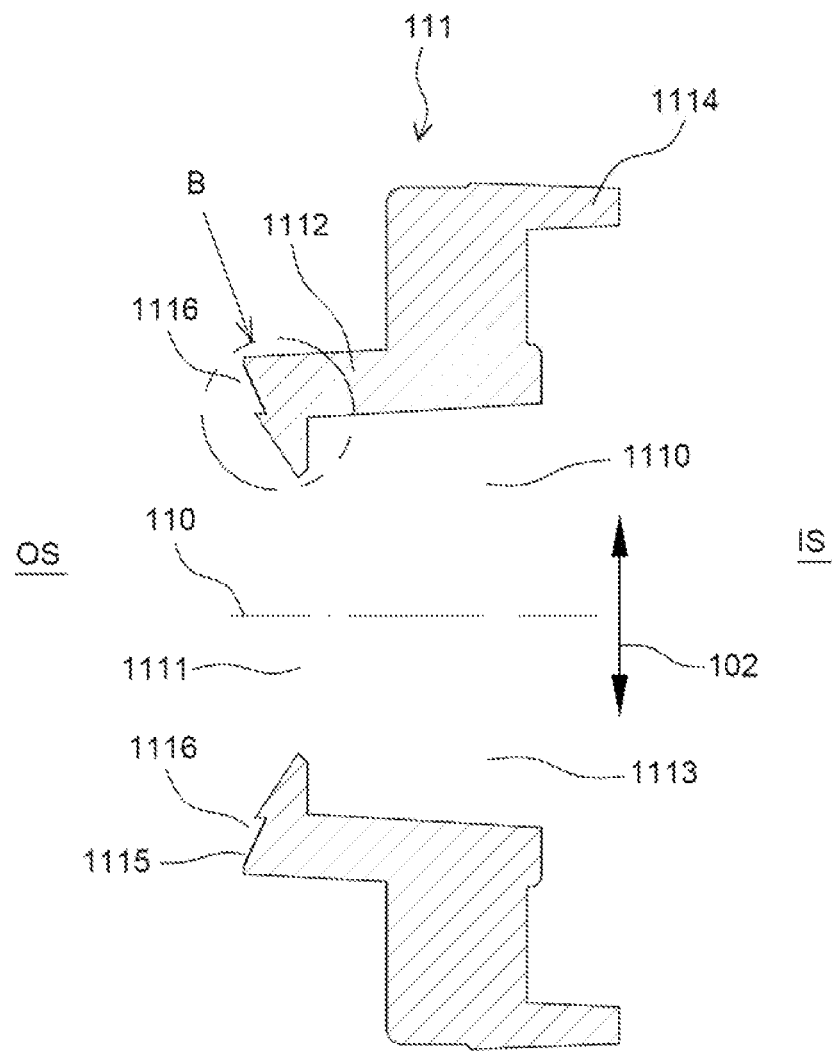
FIG. 6a is a schematic cross-sectional view of a lens barrel according to another embodiment of the present disclosure.
Figure 6B:
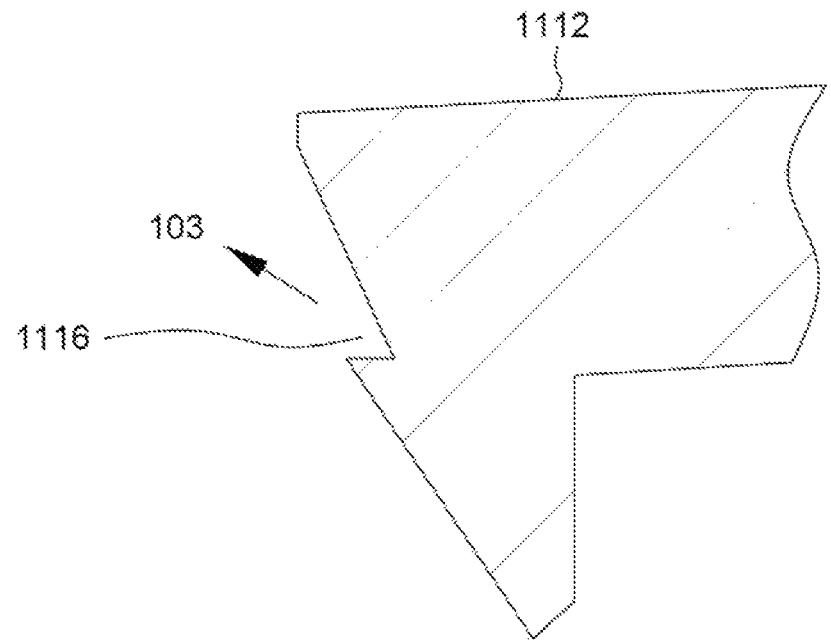

FIG. 5 is a schematic cross-sectional view I of an enlarged part A of the lens barrel in FIG. 4. The object-side end portion 1112 has an object-side surface 1115. In this embodiment, the object-side surface 1115 includes a plurality of annular grooves 1116. The annular grooves 1116 are sequentially arranged in a radial direction 102 and surround the object-side opening 1111. A cross-section of the plurality of annular grooves 1116 on the object-side surface 1115 may be regarded as the zigzag structure. FIG. 6a is a schematic cross-sectional view of a lens barrel according to another embodiment of the present disclosure. FIG. 6b is a schematic cross-sectional view of an enlarged part B of the lens barrel in FIG. 6a. In another embodiment, the object-side end portion 1112 may include the zigzag structure of only one annular groove 1116. The annular groove 116 surrounds the object-side opening 1111. The zigzag structure of the annular groove 1116 can effectively reduce the reflection of non-imaging light during the projection onto the object-side surface 1115 of the lens barrel 111, so as to reduce the stray light and reduce non-imaging light entering the lens module 11, thereby improving the optical imaging quality.

Figure 7:
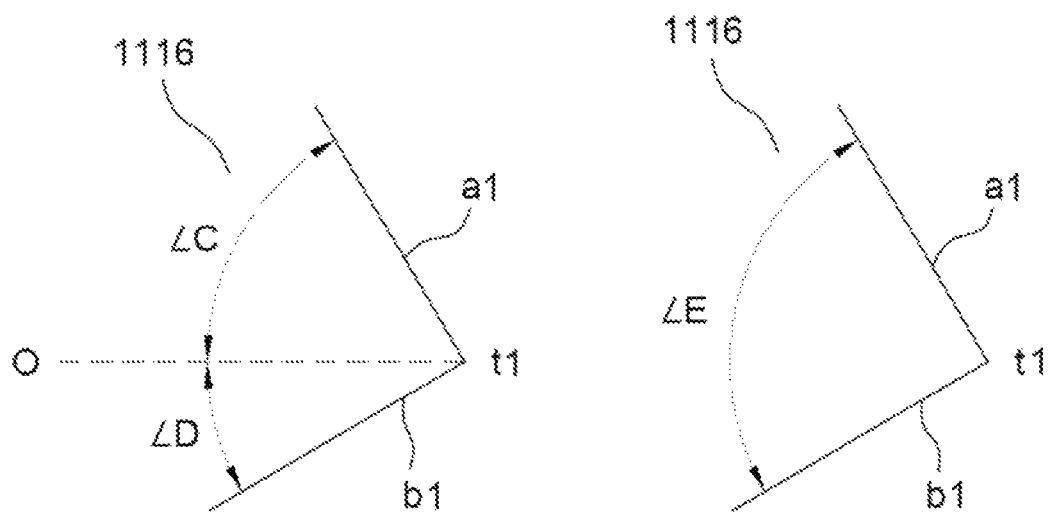
FIG. 7 is a schematic cross-sectional view of a radial cross-section of an annular groove according to an embodiment of the present disclosure.

Referring to FIG. 5 again, an opening direction 103 of the radial cross-section of the annular groove 1116 is far away from the central axis 110, and the radial cross-section of the annular groove 1116 has a first line segment a1 and a second line segment b1. The first line segment a1 is farther away from the central axis 110 than the second line segment b1, and the first line segment a1 and the second line segment b1 intersect at a first point t1. Referring to FIG. 7, a straight line O parallel to the central axis 110 is defined to pass through the first point t1. A first included angle ∠C is formed between the first line segment a1 and the straight line O, a second included angle ∠D is formed between the second line segment b1 and the straight line O, and a third included angle ∠E is formed between the first line segment a1 and the second line segment b1. The third included angle ∠E is required to be between 15 degrees and 90 degrees. That is to say, 15 degrees≤the third included angle ∠E≤90 degrees. The second line segment b1 and the first line segment a1 are respectively located on two sides of the straight line O, and the first included angle ∠C is greater than the second included angle ∠D, whereby the opening direction 103 of the radial cross-section of the annular groove 1116 is away from the central axis 110 (as shown in FIG. 5). Preferably, the second line segment b1 may be parallel to the central axis 110 (that is, parallel to the straight line O). The annular groove 1116 is easier to manufacture, and the stray light can also be reduced.

Figure 8:
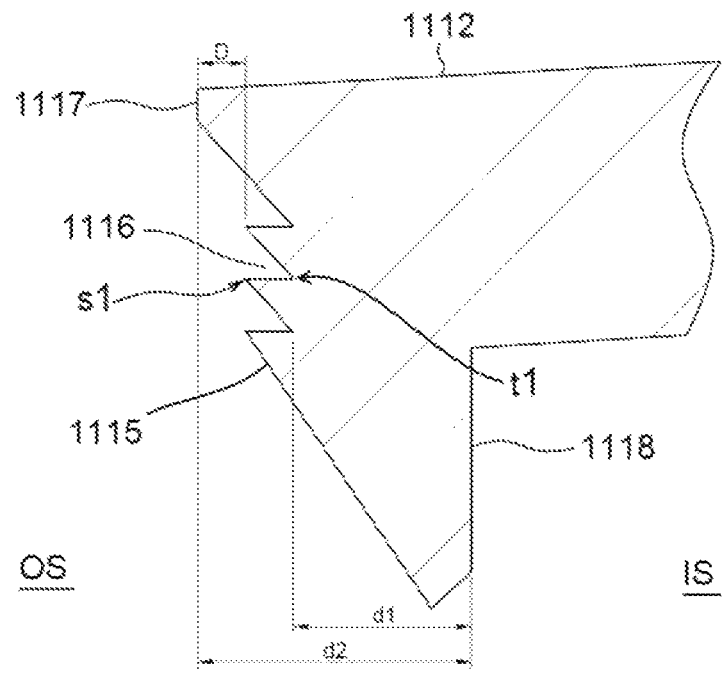
FIG. 8 is a schematic cross-sectional view II of an enlarged part A of the lens barrel in FIG. 4.

FIG. 8 is a schematic cross-sectional view II of an enlarged part A of the lens barrel in FIG. 4. The object-side surface 1115 further includes an annular surface 1117 surrounding the annular groove 1116, and the annular surface 1117 is closer to the object side OS than the annular groove 1116. The radial cross-section of the annular groove 1116 has a second point s1 at a position closest to the object side OS, and a distance D from the annular surface 1117 to the second point s1 of the radial cross-section of the annular groove 1116 along the central axis 110 is greater than 0.01 mm. When the annular surface 1117 is used as a support during assembling of the optical lens, the distance D can be used as a buffer distance for protecting the annular groove 1116. The object-side end portion 1112 further includes an image-side surface 1118 in contact with an optical lens (not shown). A distance from the image-side surface 1118 to the first point t1 of the radial cross-section of the annular groove 1116 along the central axis 110 is defined as a first distance d1, and 0.1 mm≤the first distance d1≤1.0 mm. The first distance d1 should not be too small, so as to avoid insufficient structural strength between the object-side surface 1115 and the image-side surface 1118. Furthermore, a distance from the image-side surface 1118 to the annular surface 1117 along the central axis 110 is defined as a second distance d2, and 5/10≤a ratio of the first distance d1 to the second distance d2≤9/10, whereby the insufficient structural strength between the object-side surface 1115 and the image-side surface 1118 can also be avoided.

Figure 9:
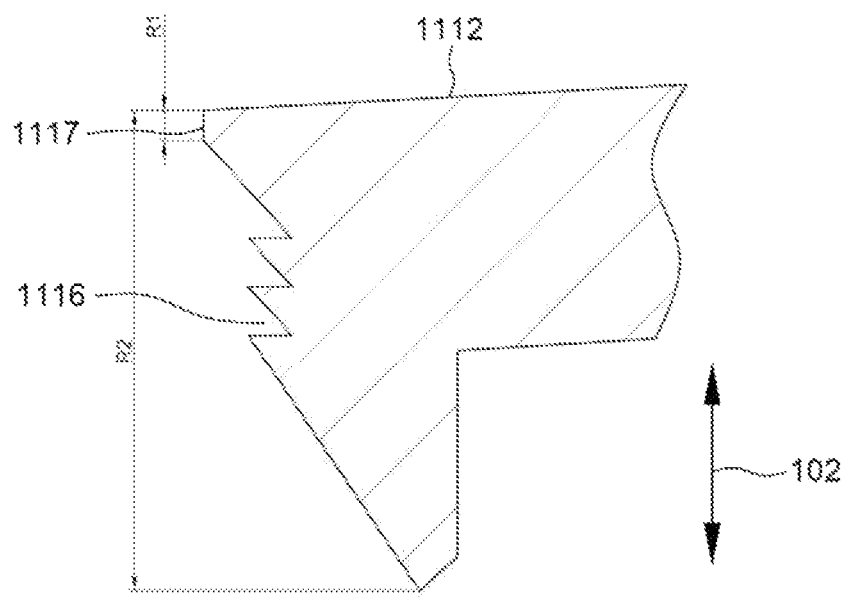
FIG. 9 is a schematic cross-sectional view III of an enlarged part A of the lens barrel in FIG. 4.

FIG. 9 is a schematic cross-sectional view III of an enlarged part A of the lens barrel in FIG. 4. The radial length of the annular surface 1117 is defined as a first length R1.

The first length R1 is greater than or equal to 0.01 mm. The annular surface 1117 needs to have a sufficient radial length (the first length R1) as a support during assembling of the optical lenses, but the light reflection may be affected. Therefore, the radial length of the annular surface 1117 (the first length R1) needs to be as small as possible. Furthermore, a maximum radial length of the object-side end portion 1112 is defined as a second length R2. When $1/100 \le a$ ratio of the first length to the second length $\le 11/100$, the annular surface 1117 has the enough radial length as a support during assembling of the lens, and the influence of light reflection is reduced.

The following is a table of differences between optical simulation results of the first to fourth embodiments of the present disclosure (the design with the annular grooves) and the comparative example of the prior art (the design without the annular grooves).

Figure 10A:
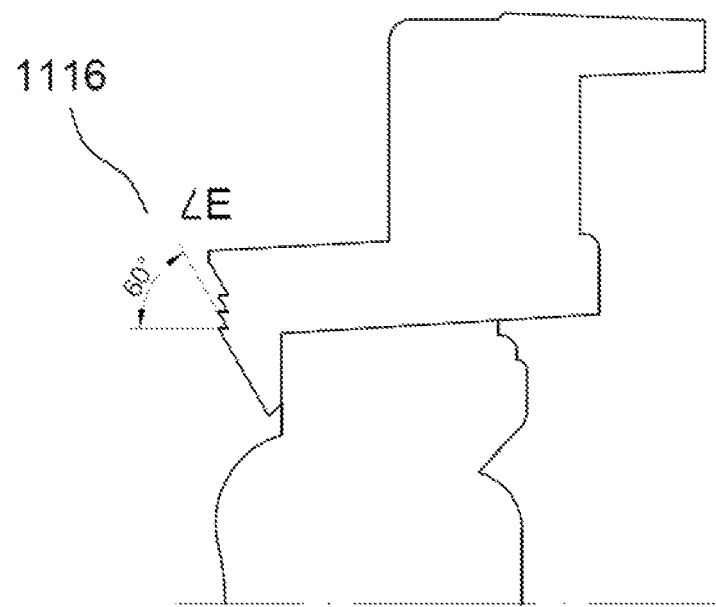
FIG. 10a to FIG. 10d are design diagrams of an annular groove on an object-side surface of the lens barrel of the first to fourth embodiments of the present disclosure, respectively.
Figure 10B:
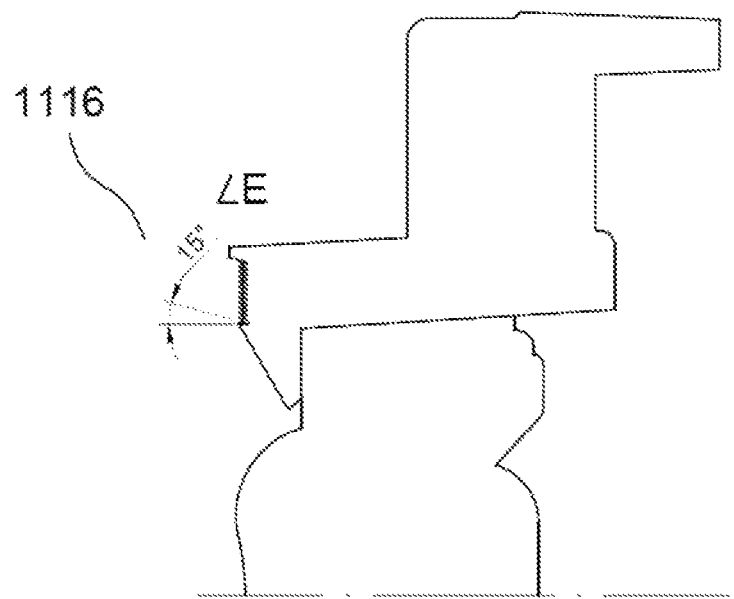
Figure 10C:
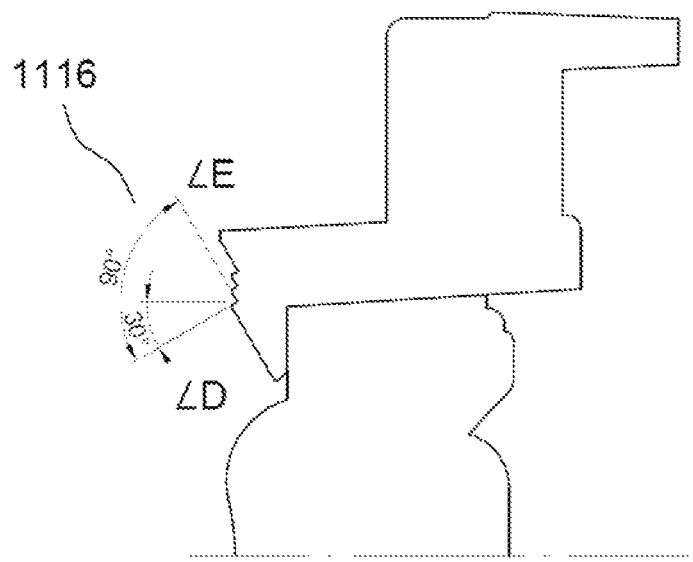
Figure 10D:
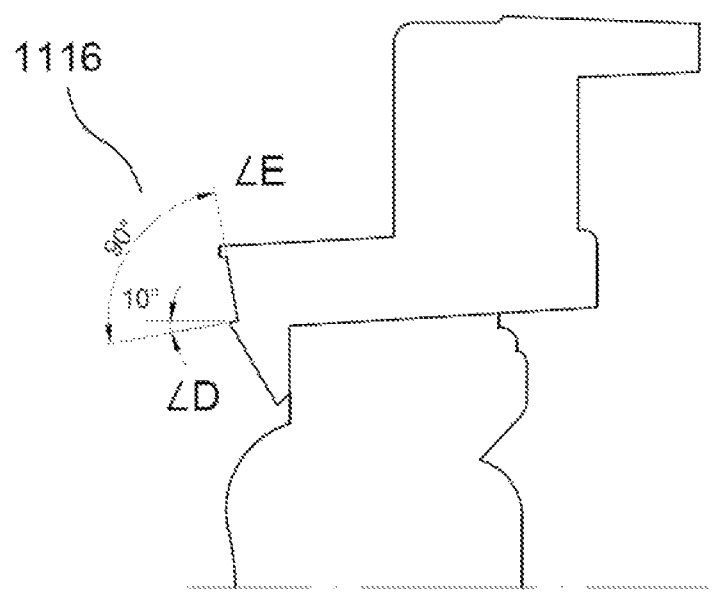
Figure 11A:
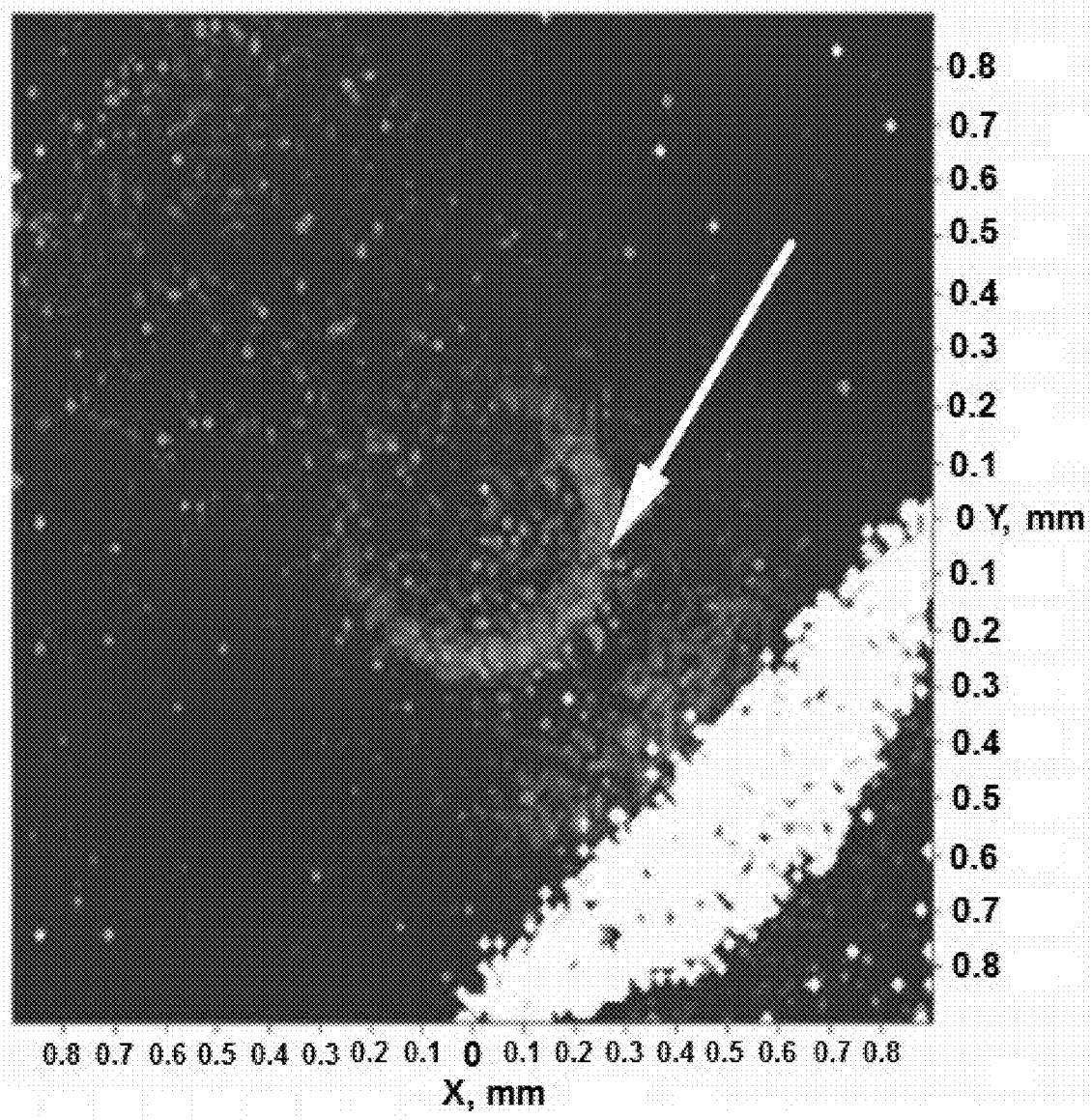
FIG. 11a to FIG. 11e are simulation pictures of stray light according to the first to fourth embodiments of the present disclosure and the comparative example, respectively.
Figure 11B:
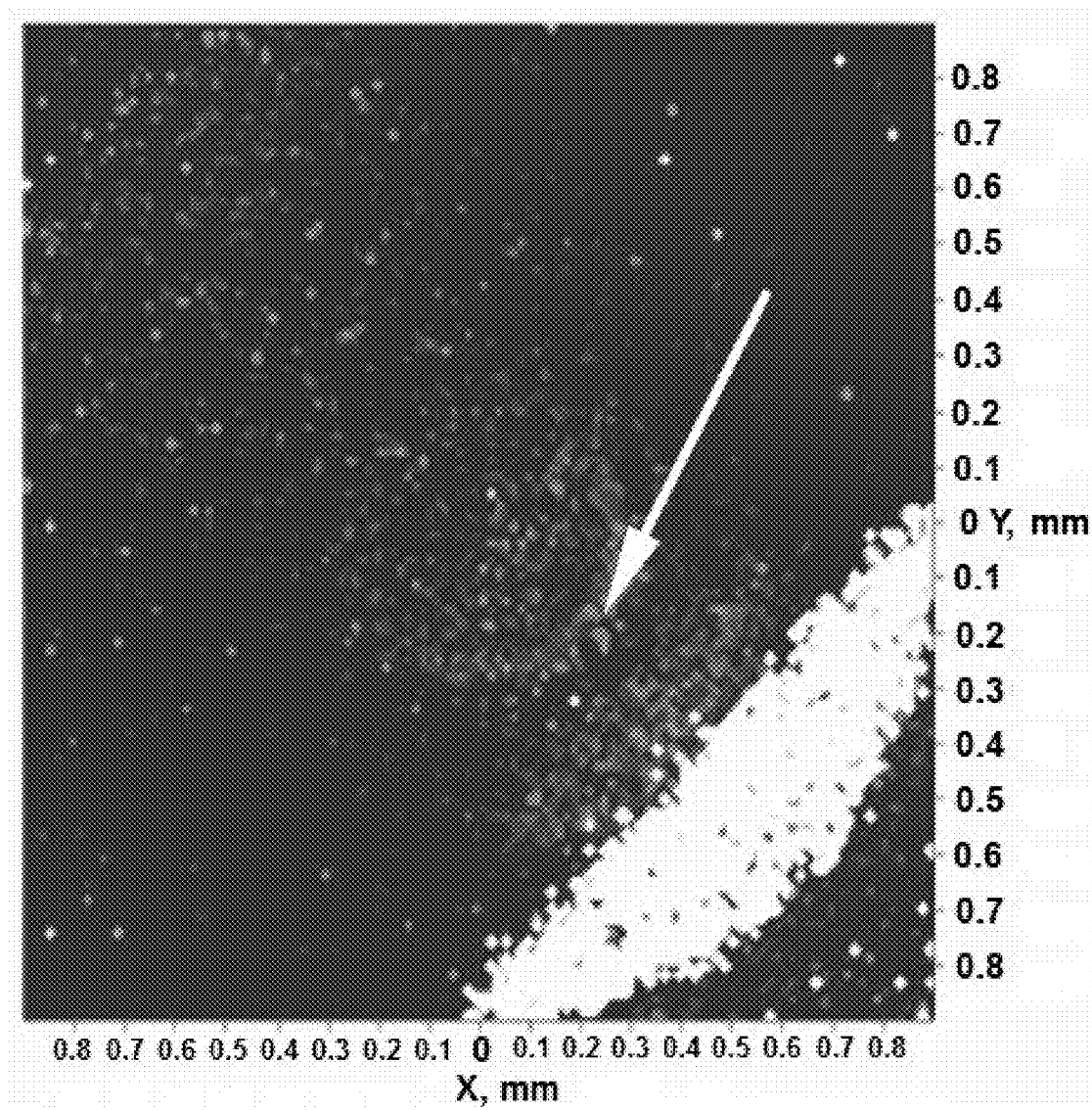
Figure 11C:
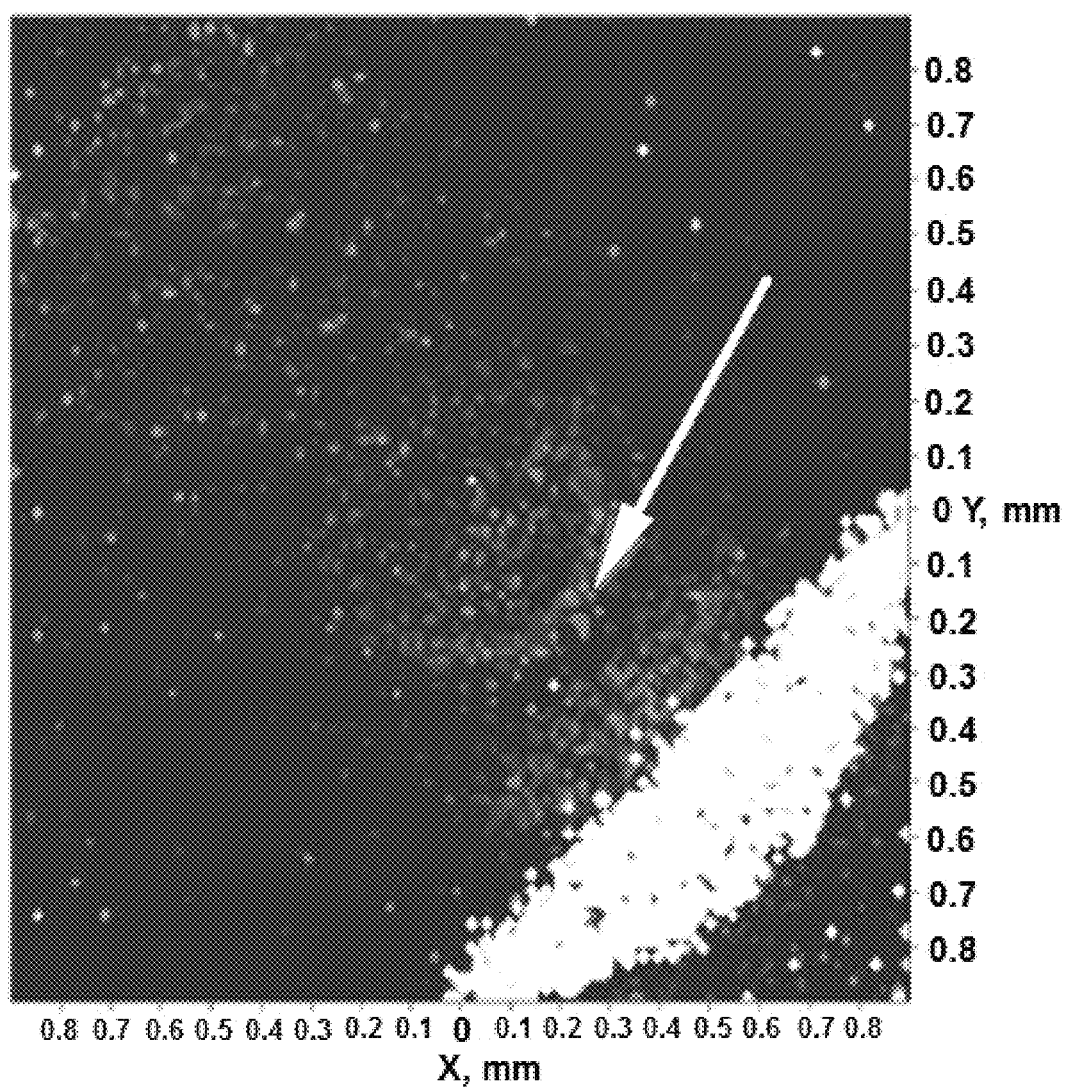
Figure 11D:
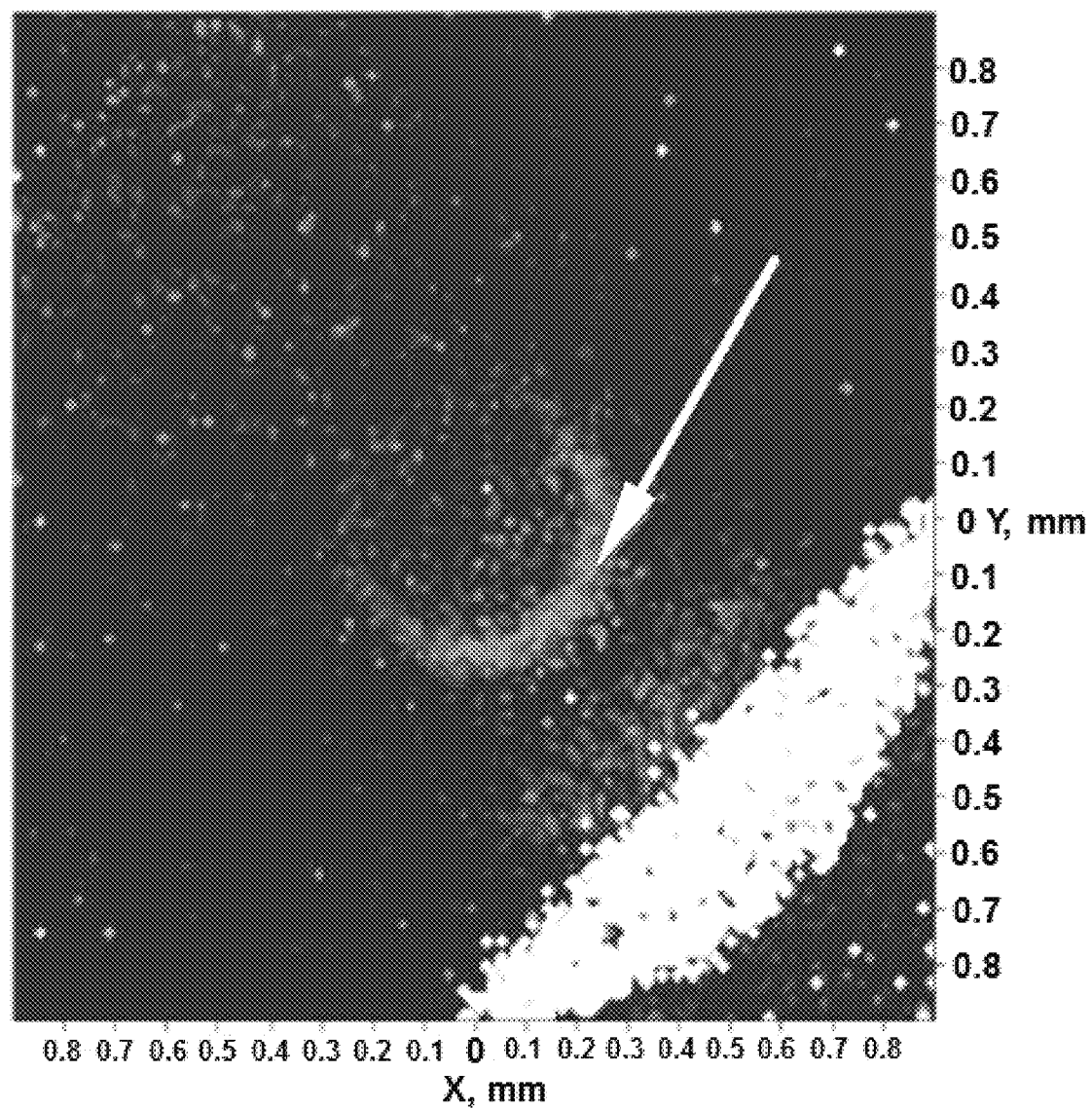
Figure 11E:
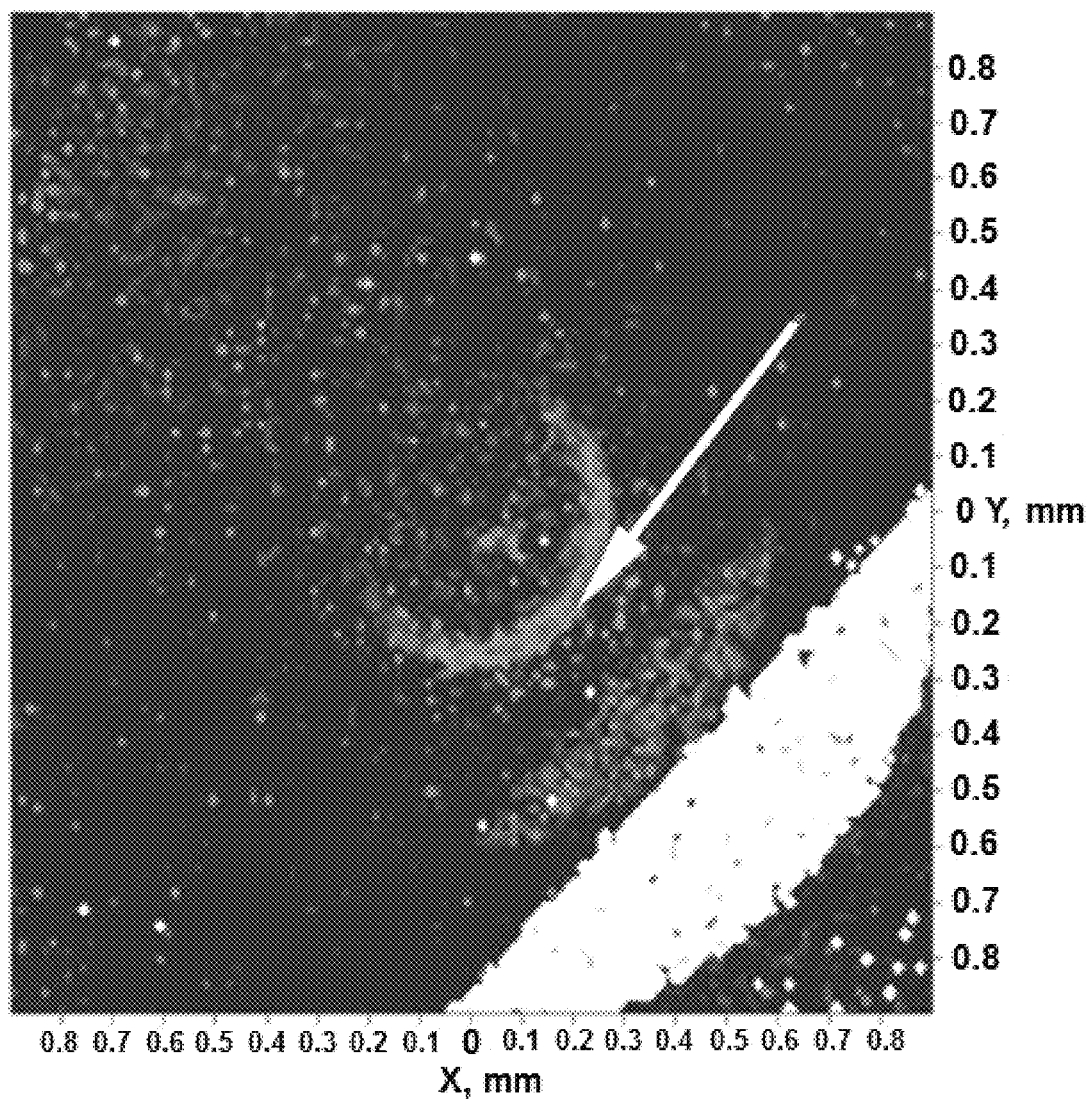

|  | First embodiment | Second embodiment | Third embodiment | Fourth embodiment | Comparative example of the prior art |
|---|---|---|---|---|---|
| Design diagrams of the annular grooves on the object-side surface of the lens barrel | FIG. 10a | FIG. 10b | FIG. 10c | FIG. 10d | Design without the annular grooves |
| Stray light simulation picture (shown by arrows) | FIG. 11a | FIG. 11b | FIG. 11c | FIG. 11d | FIG. 11e |
| Light simulation path | Lens barrel → transparent flat plate (e.g., display panel) → image sensor | | | | |
| Energy (illuminance) simulation value | 3.38E+04 | 2.48E+04 | 4.24E+04 | 8.03E+04 | 1.72E+5 |

In the first embodiment of the present disclosure, the object-side surface includes a plurality of annular grooves 1116, and the third included angle ∠E is 60 degrees. In the second embodiment of the present disclosure, the object-side surface includes a plurality of annular grooves 1116, and the third included angle ∠E is 15 degrees. In the third embodiment of the present disclosure, the object-side surface includes a plurality of annular grooves 1116. The second included angle ∠D is 30 degrees, and the third included angle ∠E is 90 degrees. In the fourth embodiment of the present disclosure, the object-side surface includes one annular groove 1116. The second included angle ∠D is 10 degrees, and the third included angle ∠E is 90 degrees. It can be known from the above stray light simulation picture that, the stray light simulation picture (pointed by the arrow in FIG. 11a to FIG. 11d) of the first to fourth embodiments of the present disclosure is more slight than the stray light simulation picture (pointed by the arrow in FIG. 11e) of the comparative example of the related art. In particular, the stray light simulation picture (pointed by the arrow in FIG. 11b) of the second embodiment of the present disclosure is the most slight, greatly reducing the influence of the stray light. In addition, it can be known from the above energy (e.g., illuminance) simulation value that the illuminance of the first to fourth embodiments of the present disclosure is indeed less than the illuminance of the comparative example (the design without annular grooves). In particular, the simulation value 2.48 E+04 of the illuminance of the second embodiment of the present disclosure is the minimum value, greatly reducing the influence of the stray light.

According to the optical recognition device of the present disclosure, the annular groove of the lens barrel has zigzag structure, in particular, the included angle (that is, the third included angle) of the radial cross-section of the annular groove is between 15 degrees and 90 degrees, and the opening direction of the radial cross-section of the annular groove is far away from the central axis, whereby the reflection of non-imaging light during projection onto the object-side surface of the lens barrel can be effectively reduced to reduce stray light, reducing non-imaging light entering the lens module, and improving the optical imaging quality.

The above is merely the preferred implementations or embodiments of the technical means adopted by the present disclosure for solving problems, and is not intended to limit the patent implementation scope of the present disclosure. That is, all the equivalent variations and modifications that correspond to the context and meaning of the patent application scope of the present disclosure or that are made according to the patent scope of the present disclosure shall fall within the protection scope of the patent scope of the present disclosure.

What is claimed is:

1. A lens barrel, defining a central axis, having an accommodating space, and comprising:
    an object-side opening and an object-side end portion, both located at one end of the central axis, wherein the object-side end portion surrounds the object-side opening and has an object-side surface, the object-side surface comprises an annular groove, a radial cross-section of the annular groove has a first line segment and a second line segment, the first line segment is farther away from the central axis than the second line segment, the first line segment and the second line segment intersect at a first point, and a straight line parallel to the central axis is defined to pass through the first point, a first included angle is formed between the first line segment and the straight line, a second included angle is formed between the second line segment and the straight line, and a third included angle is formed between the first line segment and the second line segment; and
    an image-side opening located at the other end of the central axis;
    wherein 15 degrees≤the third included angle≤90 degrees, and an opening direction of the radial cross-section of the annular groove is away from the central axis.

2. The lens barrel according to claim 1, wherein the object-side surface comprises a plurality of annular grooves sequentially arranged in a radial direction and surrounding the object-side opening.

3. The lens barrel according to claim 1, wherein the second line segment and the first line segment are respectively located on two sides of the straight line, or the second line segment is parallel to the central axis.

4. The lens barrel according to claim 1, wherein the first included angle is greater than the second included angle.

5. The lens barrel according to claim 1, wherein the object-side surface further comprises an annular surface surrounding the annular groove, and the annular surface is closer to an object side than the annular groove.

6. The lens barrel according to claim 5, wherein the radial cross-section of the annular groove has a second point at a position closest to the object side, and a distance from the annular surface to the second point of the radial cross-section of the annular groove along the central axis is greater than 0.01 mm.

7. The lens barrel according to claim 5, wherein a radial length of the annular surface is greater than or equal to 0.01 mm.

8. The lens barrel according to claim 5, wherein a radial length of the annular surface is a first length, a maximum radial length of the object-side end portion is a second length, and 1/100≤a ratio of the first length to the second length≤11/100.

9. The lens barrel according to claim 1, wherein the object-side end portion further comprises an image-side surface in contact with a lens, a distance from the image-side surface to the first point of the radial cross-section of the annular groove along the central axis is defined as a first distance, and 0.1 mm≤the first distance≤1.0 mm.

10. The lens barrel according to claim 1, wherein the object-side end portion further comprises an image-side surface in contact with a lens, and a distance from the image-side surface to the first point of the radial cross-section of the annular groove along the central axis is defined as a first distance; and the object-side surface further comprises an annular surface, a distance from the image-side surface to the annular surface along the central axis is defined as a second distance, and 5/10≤a ratio of the first distance to the second distance≤9/10.

11. An optical recognition device, in order from an object side to an image side, comprising:
   a flat plate;
   a lens module comprising a lens barrel and an optical lens assembly disposed in the lens barrel; and
   an image sensor;
   wherein the lens barrel defines a central axis, has an accommodating space, and comprises:
   an object-side opening and an object-side end portion, both located at one end of the central axis, wherein the object-side end portion surrounds the object-side opening and has an object-side surface, the object-side surface comprises an annular groove, a radial cross-section of the annular groove has a first line segment and a second line segment, the first line segment is farther away from the central axis than the second line segment, the first line segment and the second line segment intersect at a first point, and a straight line parallel to the central axis is defined to pass through the first point, a first included angle is formed between the first line segment and the straight line, a second included angle is formed between the second line segment and the straight line, and a third included angle is formed between the first line segment and the second line segment; and
   an image-side opening located at the other end of the central axis;
   wherein 15 degrees≤the third included angle≤90 degrees, and an opening direction of the radial cross-section of the annular groove is away from the central axis.

12. The optical recognition device according to claim 11, wherein the object-side surface comprises a plurality of annular grooves sequentially arranged in a radial direction and surrounding the object-side opening.

13. The optical recognition device according to claim 11, wherein the second line segment and the first line segment are respectively located on two sides of the straight line, or the second line segment is parallel to the central axis.

14. The optical recognition device according to claim 11, wherein the first included angle is greater than the second included angle.

15. The optical recognition device according to claim 11, wherein the object-side surface further comprises an annular surface surrounding the annular groove, and the annular surface is closer to an object side than the annular groove.

16. The optical recognition device according to claim 15, wherein the radial cross-section of the annular groove has a second point at a position closest to the object side, and a distance from the annular surface to the second point of the radial cross-section of the annular groove along the central axis is greater than 0.01 mm.

17. The optical recognition device according to claim 15, wherein a radial length of the annular surface is greater than or equal to 0.01 mm.

18. The optical recognition device according to claim 15, wherein a radial length of the annular surface is a first length, a maximum radial length of the object-side end portion is a second length, and 1/100≤a ratio of the first length to the second length≤ 11/100.

19. The optical recognition device according to claim 11, wherein the object-side end portion further comprises an image-side surface in contact with a lens, a distance from the image-side surface to the first point of the radial cross-section of the annular groove along the central axis is defined as a first distance, and 0.1 mm≤the first distance≤1.0 mm.

20. The optical recognition device according to claim 11, wherein the object-side end portion further comprises an image-side surface in contact with a lens, and a distance from the image-side surface to the first point of the radial cross-section of the annular groove along the central axis is defined as a first distance; and the object-side surface further comprises an annular surface, a distance from the image-side surface to the annular surface along the central axis is defined as a second distance, and 5/10≤a ratio of the first distance to the second distance≤9/10.

* * * * *